United States Patent
Kagan et al.

(10) Patent No.: US 7,930,437 B2
(45) Date of Patent: Apr. 19, 2011

(54) NETWORK ADAPTER WITH SHARED DATABASE FOR MESSAGE CONTEXT INFORMATION

(75) Inventors: Michael Kagan, Zichron Yaacov (IL); Diego Crupnicoff, Buenos Aires (AR); Gilad Shainer, Binyamina (IL); Ariel Shahar, Haifa (IL)

(73) Assignee: Mellanox Technologies Ltd., Yokneam (IL)

( * ) Notice: Subject to any disclaimer, the term of this patent is extended or adjusted under 35 U.S.C. 154(b) by 0 days.

(21) Appl. No.: 12/369,795

(22) Filed: Feb. 12, 2009

(65) Prior Publication Data

US 2009/0182900 A1   Jul. 16, 2009

Related U.S. Application Data

(60) Continuation of application No. 11/329,074, filed on Jan. 11, 2006, now Pat. No. 7,603,429, which is a division of application No. 10/118,941, filed on Apr. 10, 2002, now abandoned, and a continuation-in-part of application No. 10/000,456, filed on Dec. 4, 2001, and a continuation-in-part of application No. 10/052,413, filed on Jan. 23, 2002, now Pat. No. 7,152,122.

(60) Provisional application No. 60/283,018, filed on Apr. 11, 2001.

(51) Int. Cl.
*G06F 15/16* (2006.01)
(52) U.S. Cl. ......... 709/250; 709/200; 370/389; 370/412
(58) Field of Classification Search .................. 709/250, 709/200, 230–44; 370/389, 412
See application file for complete search history.

(56) References Cited

U.S. PATENT DOCUMENTS

| | | | |
|---|---|---|---|
| 6,594,712 B1 * | 7/2003 | Pettey et al. | 710/22 |
| 6,668,299 B1 * | 12/2003 | Kagan et al. | 710/305 |
| 6,694,361 B1 * | 2/2004 | Shah et al. | 709/222 |
| 6,704,831 B1 * | 3/2004 | Avery | 710/310 |
| 6,807,581 B1 * | 10/2004 | Starr et al. | 709/250 |
| 6,831,916 B1 * | 12/2004 | Parthasarathy et al. | 370/359 |
| 6,832,310 B1 * | 12/2004 | Bailey et al. | 713/1 |
| 6,912,604 B1 * | 6/2005 | Tzeng et al. | 710/52 |
| 6,948,004 B2 * | 9/2005 | Gasbarro et al. | 709/250 |
| 6,975,593 B2 * | 12/2005 | Collier et al. | 370/236 |
| 7,013,419 B2 * | 3/2006 | Kagan et al. | 714/749 |
| 7,152,122 B2 * | 12/2006 | Kagan et al. | 709/250 |
| 7,181,541 B1 * | 2/2007 | Burton et al. | 709/250 |
| 7,234,004 B2 * | 6/2007 | Raisch | 710/5 |

(Continued)

OTHER PUBLICATIONS

InfiniBand Architecture Specification, vol. 1 Release 1.0, Oct. 24, 2000, pp. 1-880.

*Primary Examiner* — Alina N. Boutah
(74) *Attorney, Agent, or Firm* — Mark M. Friedman (57) ABSTRACT

A network interface adapter includes a network interface and a client interface, for coupling to a client device so as to receive from the client device work requests to send messages over the network using a plurality of transport service instances. Message processing circuitry, coupled between the network interface and the client interface, includes an execution unit, which generates the messages in response to the work requests and passes the messages to the network interface to be sent over the network. A memory stores records of the messages that have been generated by the execution unit in respective lists according to the transport service instances with which the messages are associated. A completion unit receives the records from the memory and, responsive thereto, reports to the client device upon completion of the messages.

9 Claims, 4 Drawing Sheets

U.S. PATENT DOCUMENTS

| | | | |
|---|---|---|---|
| 7,299,290 B2* | 11/2007 | Karpoff | 709/231 |
| 7,603,429 B2* | 10/2009 | Kagan et al. | 709/214 |
| 2001/0037406 A1* | 11/2001 | Philbrick et al. | 709/250 |
| 2002/0099879 A1* | 7/2002 | Bayer et al. | 710/22 |
| 2002/0141424 A1* | 10/2002 | Gasbarro et al. | 370/412 |
| 2002/0152327 A1* | 10/2002 | Kagan et al. | 709/250 |
| 2002/0152328 A1* | 10/2002 | Kagan et al. | 709/250 |
| 2003/0031183 A1* | 2/2003 | Kashyap et al. | 370/395.2 |
| 2004/0015622 A1* | 1/2004 | Avery | 710/22 |
| 2004/0128398 A1* | 7/2004 | Pettey | 709/249 |
| 2006/0013397 A1* | 1/2006 | Dorsch et al. | 380/256 |

* cited by examiner

NETWORK ADAPTER WITH SHARED DATABASE FOR MESSAGE CONTEXT INFORMATION

CROSS-REFERENCE TO RELATED APPLICATIONS

This application is a continuation of U.S. application Ser. No. 11/329,074 filed Jan. 11, 2006, which is a Divisional of U.S. application Ser. No. 10/118,941 filed Apr. 10, 2002, now abandoned, which claims benefit of U.S. Provisional Application No. 60/283,018 filed Apr. 11, 2001, and is a Continuation-In-Part of U.S. patent application Ser. No. 10/000,456 filed Dec. 4, 2001 and of U.S. application Ser. No. 10/052,413 filed Jan. 23, 2002 now U.S. Pat. No. 7,152,122.

FIELD OF THE INVENTION

The present invention relates generally to digital network communications, and specifically to network adapters for interfacing between a host processor and a packet data network.

BACKGROUND OF THE INVENTION

The computer industry is moving toward fast, packetized, serial input/output (I/O) bus architectures, in which computing hosts and peripherals are linked by a switching network, commonly referred to as a switching fabric. A number of architectures of this type have been proposed, culminating in the "InfiniBand™" (IB) architecture, which has been advanced by a consortium led by a group of industry leaders (including Intel, Sun Microsystems, Hewlett Packard, IBM, Compaq, Dell and Microsoft). The IB architecture is described in detail in the InfiniBand Architecture Specification, Release 1.0 (October, 2000), which is incorporated herein by reference. This document is available from the InfiniBand Trade Association.

A host processor (or host) connects to the IB network via a network interface adapter, which is referred to in IB parlance as a host channel adapter (HCA). Typically, the HCA is implemented as a single chip, with connections to the host bus and to the network. Client processes running on the host communicate with the transport layer of the IB fabric by manipulating a transport service instance, known as a "queue pair" (QP), made up of a send work queue and a receive work queue. The IB specification permits the HCA to allocate as many as 16 million ($2^{24}$) QPs, each with a distinct queue pair number (QPN). A given client may open and use multiple QPs simultaneously.

To send and receive communications over the network, the client initiates work requests (WRs), which causes work items, called work queue elements (WQEs), to be placed onto the appropriate queues. The channel adapter then executes the work items, so as to communicate with the corresponding QP of the channel adapter at the other end of the link. After it has finished servicing a WQE, the HCA writes a completion queue element (CQE) to a completion queue, to be read by the client.

The QP that initiates a particular operation, i.e. injects a message into the fabric, is referred to as the requester, while the QP that receives the message is referred to as the responder. An IB operation is defined to include a request message generated by the requester and, as appropriate, its corresponding response generated by the responder. (Not all request messages have responses.) Each message consists of one or more IB packets. Typically, a given HCA will serve simultaneously both as a requester, transmitting requests and receiving responses on behalf of local clients, and as a responder, receiving requests from other channel adapters and returning responses accordingly.

Each QP is configured for a certain transport service type, based on how the requesting and responding QPs interact. Both the source and destination QPs must be configured for the same service type. The IB specification defines four service types: reliable connection, unreliable connection, reliable datagram and unreliable datagram. The reliable services require that the responder acknowledge all messages that it receives from the requester.

Request messages include, inter alia, remote direct memory access (RDMA) write and send requests, both of which cause the responder to write data to a memory address at its own end of the link, and RDMA read requests, which cause the responder to read data from a memory address and return it to the requester. Atomic read-modify-write requests can cause the responder both to write data to its own memory and to return data to the requester. Most response messages consist of a single acknowledgment packet, except for RDMA read responses, which may contain up to $2^{31}$ bytes of data, depending on the data range specified in the request.

To generate an outgoing message or to service an incoming message on a given QP, the HCA uses context information pertaining to the QP. The QP context is created in a memory accessible to the HCA by the client process that sets up the QP. The client configures the QP context with fixed information such as the destination address (referred to as the LID—local identifier) for connected services, negotiated operating limits, service level and keys for access control. Typically, a variable part of the context, such as the current packet sequence number (PSN) and information regarding the WQE being serviced by the QP, is subsequently updated by the HCA as it sends and receives messages. This information can be maintained in a database record of fixed size for each QP.

In addition, in order to track the completion of message operations, the HCA typically keeps a record of all outstanding request messages on each QP, until the corresponding operations have been completed. For unreliable services, the message operation is considered complete as soon as the message has been sent and a CQE has been written to the host memory. For reliable services, the message operation remains outstanding until the HCA has received an acknowledgment from the responder. For an active QP, configured for reliable service and operating under congested fabric conditions, a large number of message operations may be outstanding at the same time.

Therefore, in order to hold the outstanding message information along with the other QP context data, the HCA must allocate a substantial volume of reserve memory for each QP. For efficient operation, the memory used to hold the outstanding message information should be on the RCA chip itself. It is also desirable the HCA be able to support a large number of open QPs simultaneously. At any given time, however, only a minority of these QPs will typically have messages outstanding. Thus, it is likely that most of the time, the costly on-chip memory that is allocated to each QP to hold outstanding message information will be underused.

SUMMARY OF THE INVENTION

It is an object of some aspects of the present invention to provide devices and methods for interfacing a host processor to a network, while affording enhanced efficiency in maintaining and accessing context information needed to process outstanding messages.

It is a further object of some aspects of the present invention to provide a network interface adapter chip that makes optimal use of a small on-chip memory in storing context information for a large number of transport service instances, such as QPs.

In preferred embodiments of the present invention, a HCA comprises a local database (LDB) for holding context information regarding outstanding request messages sent by the HCA. This LDB is shared among the QPs serviced by the HCA in such a way that the number of entries allocated in the LDB to each of the QPs grows and shrinks in response to the number of request messages that are outstanding for that QP. Preferably, the entries for each QP are maintained as a separate linked list in the LDB, along with a further linked list of free LDB entries that can be used to record new messages. When a message operation is completed, the corresponding entry in the LDB is effectively deleted by adding it to the free list, so that it can be overwritten by a new entry.

The shared LDB thus eliminates the need to set aside separate context memory to hold outstanding message information for each individual QP. Statistically, the average number of outstanding messages per QP is much smaller than the maximum number of messages that may be outstanding on any given QP. Therefore, the total memory required for the shared LDB is considerably less than the sum of the individual memory requirements of the QPs. As a result, the shared LDB can easily be contained in a small memory on the HCA chip.

Although the preferred embodiments described herein relate specifically to IB switch fabrics and to HCAs used with such fabrics, the principles of the present invention may similarly be applied, mutatis mutandis, to channel adapters of other types, such as target channel adapters (TCAs), as well as to network interface adapters used in other packet networks. Similarly, the notion of sharing a local database among multiple service instances can be used not only for recording outstanding messages, but also for managing other transport context records of variable size. For example, such a local database may be used to hold scatter lists, indicating the locations in a host memory to which data from incoming read response and send request messages should be written.

There is therefore provided, in accordance with a preferred embodiment of the present invention, a network interface adapter, including:
  a network interface, coupled to send and receive messages over a network;
  a client interface, for coupling to a client device so as to receive from the client device work requests to send the messages over the network using a plurality of transport service instances, each of the messages being associated with a respective one of the transport service instances; and
  message processing circuitry, coupled between the network interface and the client interface, and including:
  an execution unit, which is adapted to generate the messages in response to the work requests and to pass the messages to the network interface to be sent over the network;
  a memory, which is coupled to store records of the messages that have been generated by the execution unit in respective lists according to the transport service instances with which the messages are associated; and
  a completion unit, which is adapted to receive the records from the memory and, responsive thereto, to report to the client device, via the client interface, upon completion of the messages.

Preferably, the lists are contained together in a common database, in which each of the transport service instances has a respective number of entries, wherein the number is variable among the transport service instances. Most preferably, the number of the entries for each of the transport service instances is determined by the number of the messages associated therewith that have been sent over the network and whose completion has not yet been reported to the client device by the completion unit.

Additionally or alternatively, the lists include a linked list of the entries maintained for each of the transport service instances. Preferably, when the execution unit generates one of the messages, a corresponding one of the records is pushed onto a tail of the linked list, and when the completion unit is to report on the completion of the one of the messages, the corresponding one of the records is popped from a head of the linked list. Most preferably, the memory is adapted to store a further linked list of the entries in the database that are free for writing of further records thereto.

Typically, at least some of the transport service instances belong to a reliable transport service, and the completion unit is adapted to read the records from the memory of the messages sent using the reliable transport service when respective responses to the messages are received by the network interface, and to report the completion of the messages to the client device responsive to the records and to the responses.

In a preferred embodiment, the messages are carried over the network in the form of packets, which are sent and received by the adapter through the network interface. Preferably, the network includes a switch fabric, and wherein the network interface is coupled to send and receive the packets over the switch fabric. Most preferably, the transport service instances include queue pairs, which are used by the client device to interact with a transport layer of the network.

There is also provided, in accordance with a preferred embodiment of the present invention, a network interface adapter, including:
  a network interface, coupled to send and receive messages containing message data over a network using a plurality of transport service instances, each of the messages being associated with a respective one of the transport service instances;
  a client interface, for coupling to a client device so as to exchange the message data with the client device; and
  message processing circuitry, coupled between the network interface and the client interface and adapted to process the messages sent and received over the network using context information with respect to the transport service instances with which the messages are associated, the circuitry including:
  a first cache memory, adapted to store a first portion of the context information for at least some of the transport service instances, such that each of the at least some of the transport service instances is allocated a substantially equal part of the first cache memory; and
  a second cache memory, adapted to store a second portion of the context information for the at least some of the transport service instances, such that the part of the second cache memory allocated to each of the transport service instances varies responsive to a respective characteristic of each of the transport service instances.

Typically, the characteristic of each of the transport service instances responsive to which the part of the second cache memory allocated thereto varies includes a respective level of activity on the network that is associated with each of the transport service instances. Preferably, the message processing circuitry is adapted to report to the client device upon completion of the messages sent over the network, and the respective level of activity for each of the transport service instances is determined by a respective number of the messages associated with each of the transport service instances that have been sent over the network through the network interface but whose completion has not yet been reported to the client device. Additionally or alternatively, each of the transport service instances is assigned a respective limit on use of the second cache memory, which limit may differ among the transport service instances, and wherein the respective level of activity on the network associated with each of the transport service instances is constrained so that the use of the second cache memory does not exceed the respective limit.

Preferably, the second portion of the context information for all of the at least some of the transport service instances is contained together in a common database in the second cache memory, in which each of the transport service instances has a respective number of entries that is variable among the transport service instances. Most preferably, the second portion of the context information is held in the form of a respective linked list for each of the at least some of the transport service instances in the common database.

Further preferably, the first cache memory is coupled to load the first portion of the context information from a system memory associated with the client device, via the client interface, for the at least some of the transport service instances with respect to which the packet processing circuitry is processing the messages.

There is additionally provided, in accordance with a preferred embodiment of the present invention, a method for network communication, including:

receiving work requests from a client device to send messages over a network using a plurality of transport service instances, such that each of the messages is associated with a respective one of the transport service instances;

sending the messages over the network in response to the work requests;

storing, in a common memory shared among the transport service instances, records of the messages that have been sent over the network in respective lists according to the transport service instances with which the messages are associated; and upon completion of the messages, reading the records from the memory and, responsive thereto, reporting the completion to the client device.

There is further provided, in accordance with a preferred embodiment of the present invention, a method for network communication, including:

coupling a network adapter between a client device and a network;

storing context information in first and second cache memories of the network adapter with respect to a plurality of transport service instances for use in sending and receiving data packets over the network via the adapter, the first and second cache memories being configured to store respective first and second portions of the context information for each of the transport service instances, such that each of the transport service instances is allocated a substantially equal part of the first cache memory for the first portion of its context information, while the part of the second cache memory allocated to each of the transport service instances for the second portion of its context information varies responsive to a respective characteristic of each of the transport service instances; and processing messages sent over the network to and from the client device via the network adapter using the transport service instances, responsive to the context information stored in the first and second cache memories.

The present invention will be more fully understood from the following detailed description of the preferred embodiments thereof, taken together with the drawings in which:

DETAILED DESCRIPTION OF PREFERRED EMBODIMENTS

Figure 1:
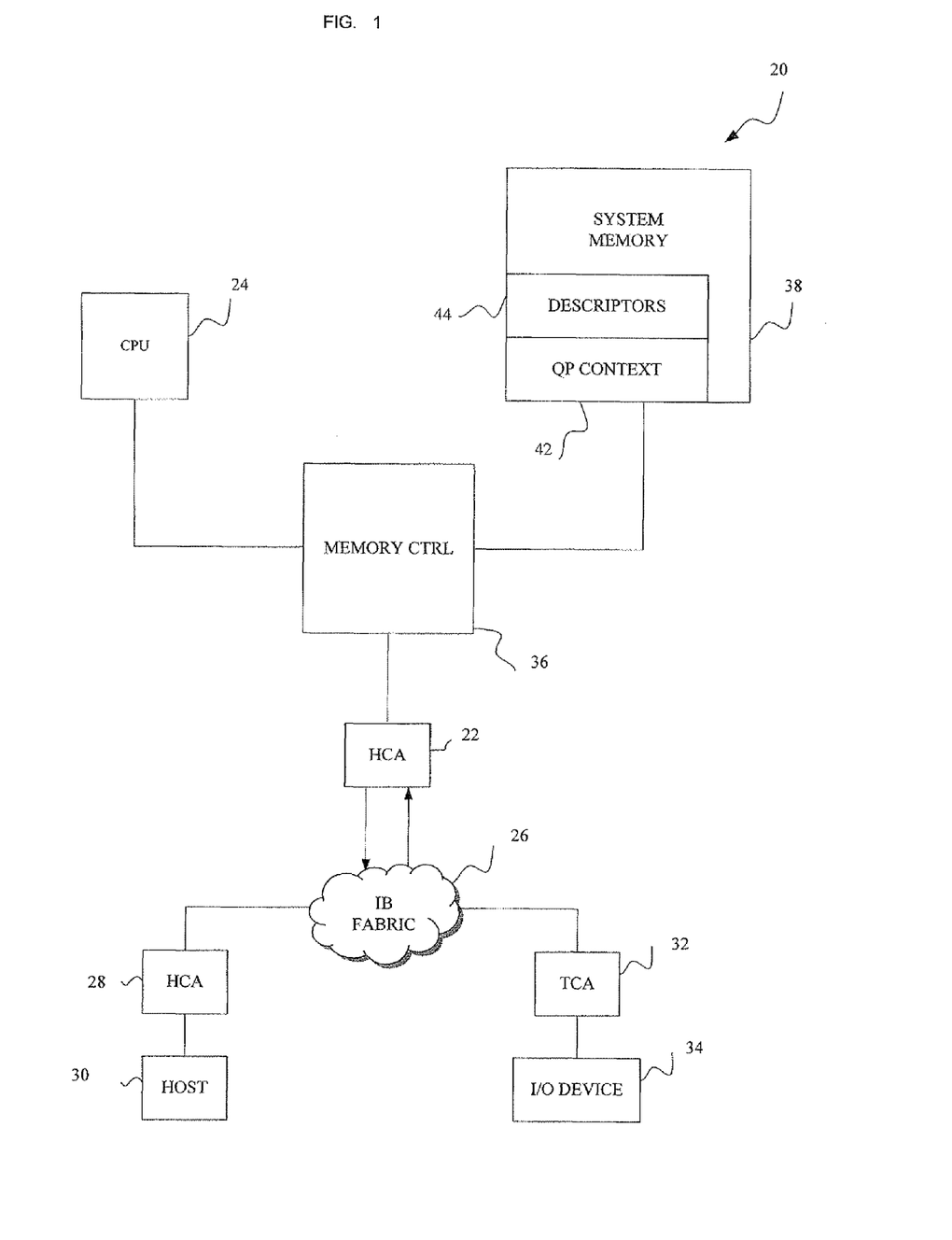
FIG. 1 is a block diagram that schematically illustrates a computer network, in accordance with a preferred embodiment of the present invention.

FIG. 1 is a block diagram that schematically illustrates an IB network communication system 20, in accordance with a preferred embodiment of the present invention. In system 20, a HCA 22 couples a host processor 24 to an IB network (or fabric) 26. Typically, processor 24 comprises an Intel Pentium™ processor or other general-purpose computing device with suitable software. HCA 22 typically communicates via network 26 with other HCAs, such as a remote HCA 28 with a remote host 30, as well as with TCAs, such as a TCA 32 connected to an input/output (I/O) device 34.

Host 24 and HCA 22 are connected to a system memory 38 via a suitable memory controller 36, as is known in the art. The HCA and memory typically occupy certain ranges of physical addresses in a defined address space on a bus connected to the controller, such as a Peripheral Component Interface (PCI) bus. In addition to the host operating system, applications and other data (not shown), memory 38 holds data structures that are accessed and used by HCA 22. These data structures preferably include QP context information 42 maintained by the HCA, and descriptors 44 corresponding to WQEs to be carried out by HCA 22. Descriptors 44 are preferably prepared and executed in the form of a linked list.

Figure 2:
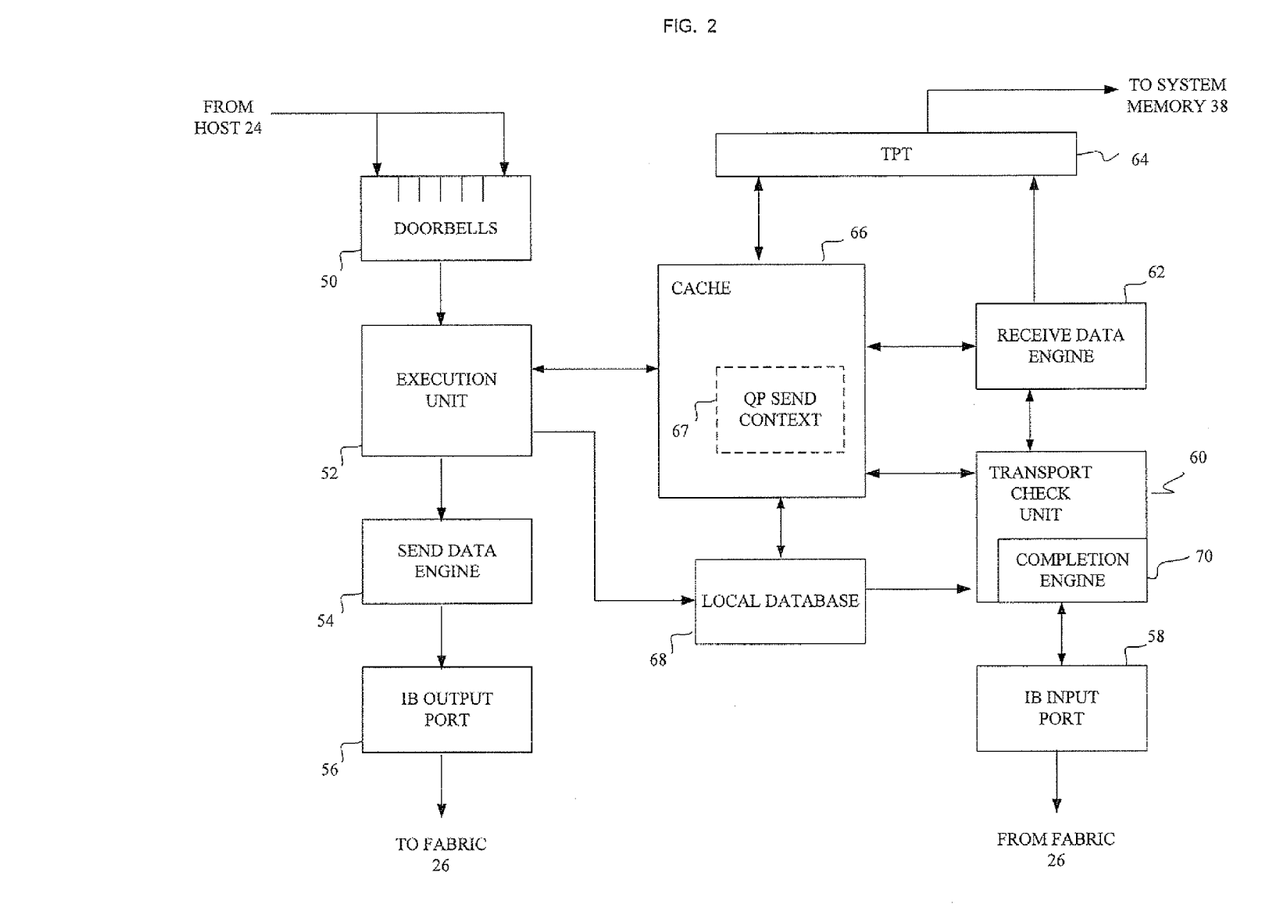
FIG. 2 is a block diagram that schematically shows details of a HCA, in accordance with a preferred embodiment of the present invention.

FIG. 2 is a block diagram that schematically shows details of HCA 22, in accordance with a preferred embodiment of the present invention. For the sake of simplicity, elements of HCA 22 that are not essential to an understanding of the present invention are omitted. The blocks and links that must be added will be apparent to those skilled in the art. Further details of the HCA are described in the above-mentioned patent applications entitled, "Network Interface Adapter with Shared Data Send Resources," and "Queue Pair Context Cache."

The various blocks that make up HCA 22 may be implemented either as hardware circuits or as software processes running on a programmable processor, or as a combination of hardware- and software-implemented elements. Although certain functional elements of HCA 22 are shown as separate blocks in the figure for the sake of conceptual clarity, the functions represented by these blocks may actually be carried out by different software processes on a single embedded processor. Preferably, all of the elements of the HCA are implemented in a single integrated circuit chip, but multi-chip implementations are also within the scope of the present invention.

In order to send out packets from HCA 22 on a given QP over network 26, host 24 posts WQBs for the QP by writing work request descriptors 44 in memory 38 (FIG. 1). For RDMA write and send requests, the descriptors indicate the source of data to be sent and its destination. The data source information typically includes a "gather list," pointing to the locations in memory 38 from which the data in the outgoing message are to be taken. For RDMA read requests, the descriptors include a "scatter list," indicating the locations in memory 38 to which the requested data are to be written, when the read response message is received. After host 24 has prepared one or more descriptors, it "rings" a doorbell 50 of HCA 22, by writing to a corresponding doorbell address occupied by the HCA in the address space on the host bus. The doorbell thus serves as an interface between host 24 and HCA 22. The process of ringing and servicing doorbell 50 is described in detail in the above-mentioned patent applications.

In response to the doorbell being rung, an execution unit 52 queues the QPs having outstanding WQEs, and schedules the QPs for service by arbitrating among the queues. When a QP reaches the head of its scheduling queue, the execution unit parses each of the WQEs in the linked list belonging to that QP. Based on the WQEs, the execution unit prepares gather entries to submit to a send data engine (SDE) 54. Each gather entry defines a piece of data to be incorporated in a packet to be prepared and sent out by the SDE. SDE 54 gathers the data to be sent from the locations in memory 38 specified by the WQEs and places the data in output packets for transmission over network 26. The data packets prepared by SDE 54 are passed to an output port 56, which performs data link operations and other necessary functions, as are known in the art, and sends the packets out over network 26.

Packets sent to HCA 22 over network 26 are received at an input port 58, which similarly performs data link and buffering functions, as are known in the art. A transport check unit (TCU) 60 verifies and processes transport-layer information contained in the incoming packets, as described in greater detail hereinbelow. When the TCU receives a packet containing data to be written to memory 38, it passes the data to a receive data engine (RDE) 62. The RDE serves as a scatter engine both for RDMA write and send requests received by HCA 22 from remote requesters (such as HCA 28, in FIG. 1) and for RDMA read responses returned to HCA 22 by remote responders (HCA 28 or TCA 32, for example). A translation and protection table (TPT) 64 acts as a host interface in HCA 22. It is used for address translation and protection checks to control access to memory 38 by elements of HCA 22, including execution unit 52, SDE 54 and RDE 62, as well as by other, remote entities connected to network 26.

In handling work requests by host 24 to send outgoing request message packets over network 26, execution unit 52 uses QP context information held in a send context cache 67, which is stored in a cache memory 66 on the HCA chip. When the HCA receives responses to these request messages from the network, TCU 60 and RDE 62 use the same send context information in cache 67 for processing the response packets. (Preferably, cache memory 66 also contains QP receive context, used in responding to incoming requests from remote requesters, and completion queue (CQ) context information. These elements are omitted from the figure for the sake of simplicity of illustration.) A fixed volume in cache memory 66 is allocated to hold the context information required for each QP being served by HCA 22. Because of memory size limitations, cache memory 66 cannot generally hold the context information required for all the QPs that have been opened by host 24. Therefore, in the event of a cache miss, HCA 22 retrieves the required QP context information from system memory 38, and loads it into cache memory 66 in place of another QP that has not been recently used.

When the last packet required by a given WQE has been sent, execution unit 52 writes an entry in a local database (LDB) 68. Each such entry corresponds to one outstanding message (and the WQE that generated it). The LDB is shared dynamically by all the QPs served by execution unit 52 and SDE 54. It holds the entries for each QP in the form of a linked list, as described below. A completion engine 70 in TCU 60 reads out the entries from the list in the LDB for each QP in order to write corresponding completion queue elements (CQEs) to completion queues in memory 38, as mandated by the IB specification. For unreliable connections, the CQE can be written immediately, as soon as the request packets are sent. For reliable connections, however, the CQE for a given request is written only after the corresponding response is received from the remote responder on the network. To prepare the CQEs, the completion engine preferably uses the CQ context information held in cache memory 66, as noted above, as well as the relevant QP context information.

TCU 60 determines that a request operation on a reliable connection has been completed when it receives the corresponding response packet (which may be an acknowledgment or a read response) from the responder on network 26. The TCU parses the destination QP field of the response packet header to identify the QP that sent the request. The TCU then asks LDB 68 to read out the entry at the head of the linked list for the identified QP, for the use of completion engine 70 in preparing the required CQE. The process by which entries are read out of LDB 68 is described below in greater detail.

According to IB convention, it is not necessary for the responder to acknowledge every packet explicitly. A response packet may therefore implicitly acknowledge several messages at once. When this occurs, TCU 60 will ask LDB 68 to read out two or more successive entries in response to a single response packet, and completion engine 70 may prepare multiple CQEs accordingly. If the expected response packet does not arrive within a predetermined time limit, however, execution unit 52 is typically prompted to resend the request, in accordance with the IB specification.

Figure 3:
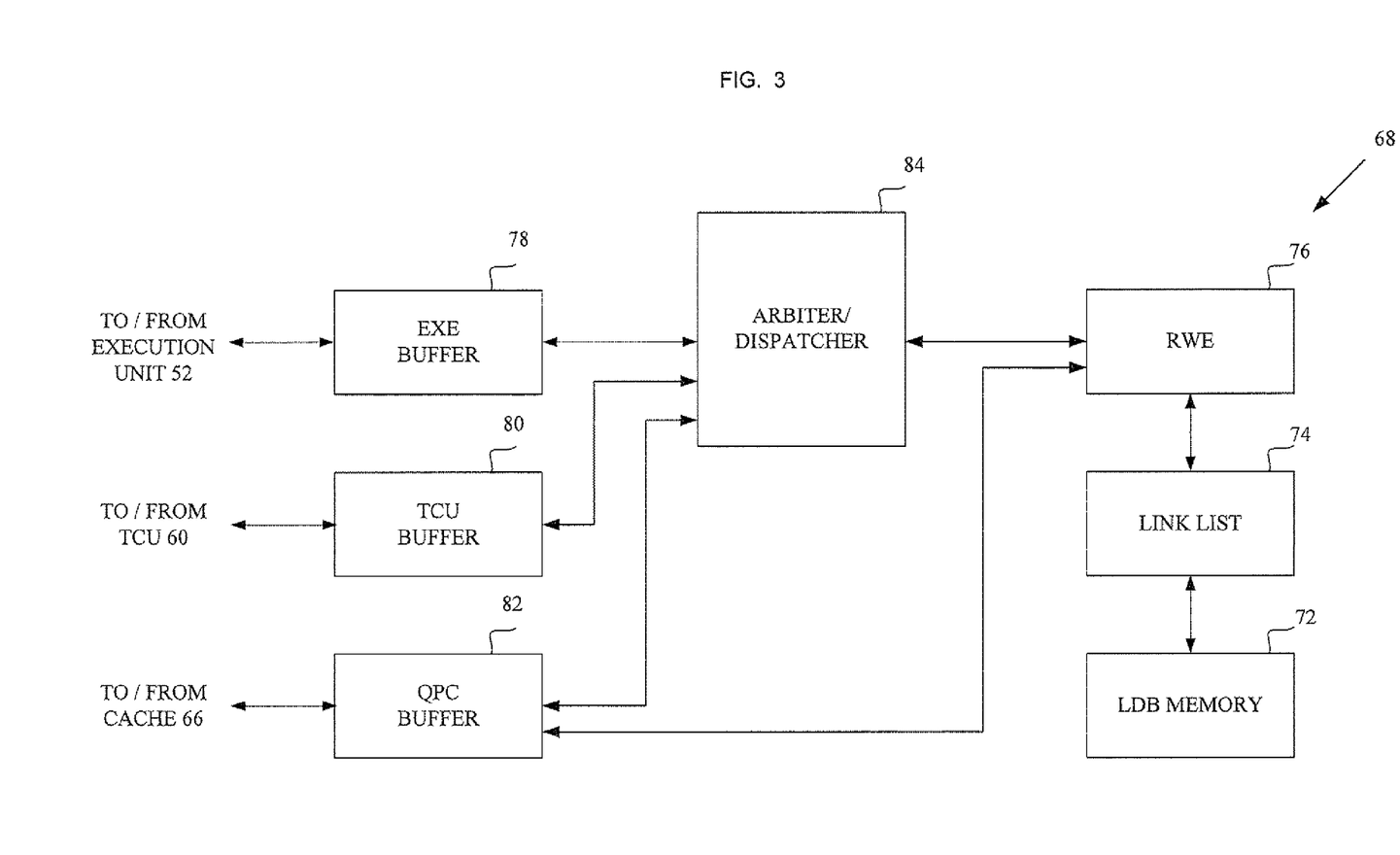
FIG. 3 is a block diagram that schematically shows details of a local database (LDB) block in the HCA of FIG. 2, in accordance with a preferred embodiment of the present invention.

FIG. 3 is a block diagram that schematically shows details of LDB 68, in accordance with a preferred embodiment of the present invention. The core of the LDB is a memory 72, which holds the LDB records. Preferably, memory 72 is implemented as a static random access memory (SRAM) array, of sufficient size to hold a number of entries equal to the largest number of request messages that are likely to be outstanding at any given time, each entry containing a record of a single request message. Typically, between 256 and 2048 entries are required for this purpose, depending on performance characteristics of the HCA. Each record preferably comprises the following fields:

Packet serial number (PSN) of the request message—For multi-packet RDMA write and send requests, the PSN field identifies the last packet in the message, for use by TCU 60 in verifying that the entire message has been acknowledged. For RDMA read requests, however, the PSN of the first packet in the message is recorded, for use by the TCU in identifying and processing the expected read response.

Descriptor address and size—These parameters identify the descriptor 44 in host memory 38 that corresponds to the WQE for the current message. The descriptor information is used by completion engine 70 in generating the appropriate CQE upon completion of the message. It can also be used in instructing execution unit 52 to resend packets, based on the appropriate descriptor, when TCU 60 fails to receive an expected acknowledgment of a message sent over a reliable transport service. After completion of the message, the descriptor can be erased from the memory.

Scatter list pointer—gives the location of the scatter list for RDMA read requests. The scatter list itself indicates the address range in memory 38 to which RDE 62 should write the data contained in the read response packets. Preferably, the scatter list is held in a separate memory array (not shown) that is allocated to the RDE for this purpose. This array is also preferably shared among the QPs that have read request messages outstanding, in a manner similar to the sharing of LDB 68.

Syndrome—used to signal error occurrences in the course of generating the request message. Normally, when no error has occurred, the syndrome is zero.

Opcode—indicates the type of request (read, write, send or atomic).

Signaled completion—flag indicating that a CQE should be generated upon completion of this request.

Event request—flag indicating that completion engine 70 should assert an interrupt to CPU 24 when it generates the CQE for this request.

Unreliable—flag indicating that this record belongs to a message sent on an unreliable service, so that a CQE can be generated without waiting for an acknowledgment from the responder.

This list of fields is presented here by way of example, and other context fields, not listed here, may also be stored as part of the records in LDB memory 72. In addition, each entry in memory 72 has a linklist control pointer, indicating the next LDB entry belonging to this QP, or the next entry on the free list, as described below. The width of this pointer is determined by the size of the database.

Figure 4:
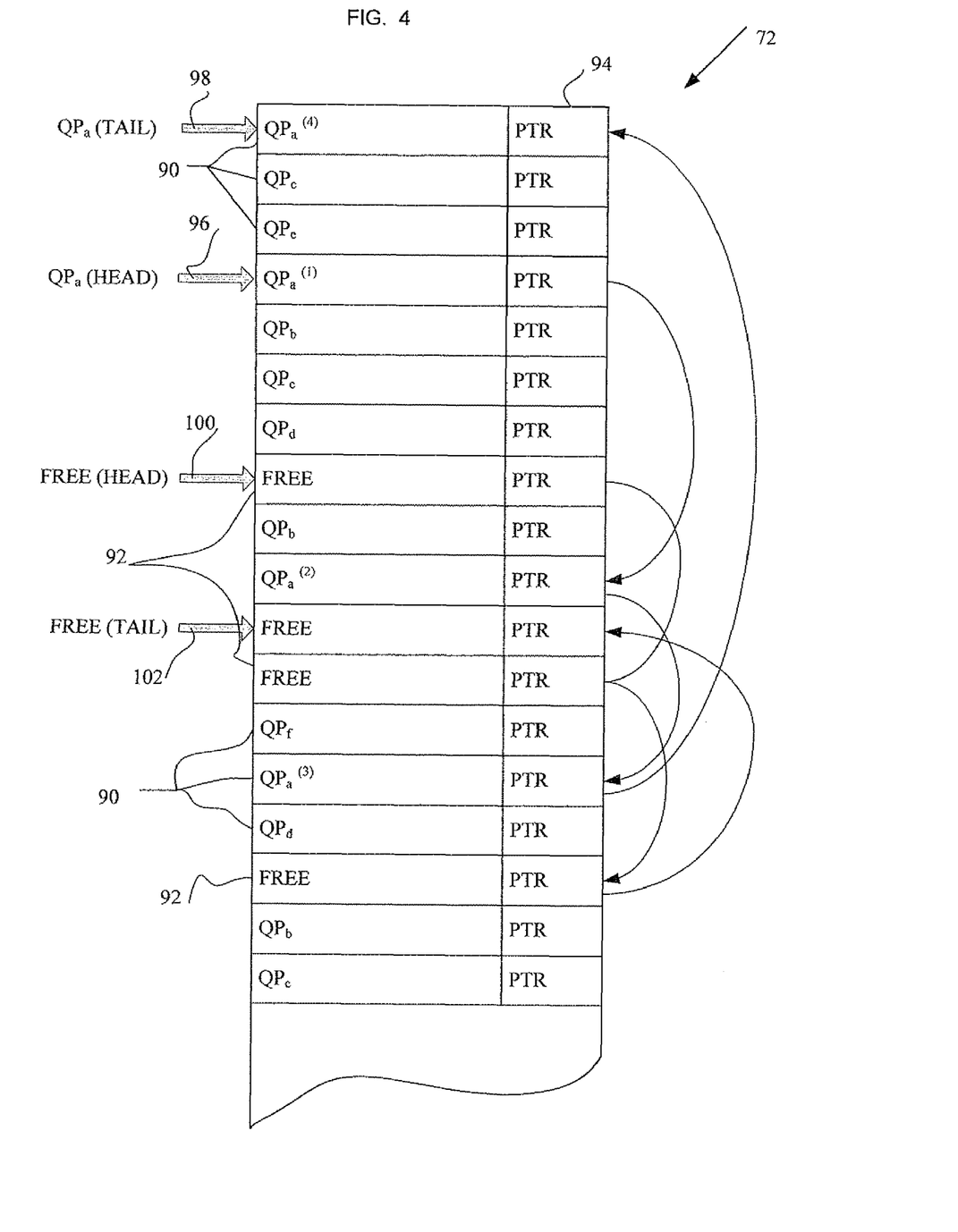
FIG. 4 is a block diagram that schematically illustrates data structures maintained in the LDB of FIG. 3, in accordance with a preferred embodiment of the present invention.

FIG. 4 is a block diagram that schematically illustrates the organization of entries in memory 72, in accordance with a preferred embodiment of the present invention. The entries include message records 90 and free entries 92. The message records belonging to each QP are organized as a separate linked list. (Even when a QP has no messages outstanding, and therefore has no message records 90, it preferably still maintains an empty linked list.) Each entry has a pointer 94, as noted above, pointing to the next record in the list to which it belongs. For example, the portion of memory 72 shown in the figure includes four records 90 belonging to a queue pair identified as QPa. A head-of-queue pointer 96, which is stored in QP send context 67 in cache 66, points to the oldest record belonging to this queue pair, QPa(1). Pointer 94 of this entry points to the next entry belonging to the queue pair, QPa(2), and so forth up to the newest record for the queue pair, QPa(4), which has a null pointer. A tail-of-queue pointer 98 in context 67 points to this last record. Each queue pair has its own head pointer 96 and tail pointer 98. The use of these pointers is described in greater detail hereinbelow.

In addition to these fields, QP send context 67 preferably also includes a LDB-use counter (not shown), indicating the number of outstanding message records 90 that the QP is currently holding in LDB memory 72. This counter is incremented each time an entry for the QP is pushed into the LDB memory, and decremented each time an entry is popped. Optionally, each QP is assigned a limit on its LDB-use counter, which may vary from one QP to another. When the counter reaches its limit for some QP, execution unit 52 stops processing WQEs on the QP and resumes only after the counter has been decremented. The variable LDB-use limit can thus be used to differentiate the service levels to which different QPs are assigned.

Entries that are not in use by any QP are identified as free entries 92. These entries are similarly maintained as a linked list, using pointers 94. A free head pointer 100 indicates the head of the free list, i.e., the next free entry 92 that can be used in creating a new database record. A free tail pointer 102 points to the last free entry.

Returning now to FIG. 3, a linklist controller 74 is responsible for maintaining the pointer structure of memory 72. The pointers are used by a read/write engine (RWE) 76 in pushing entries onto the tails of the lists and popping entries from the heads, in response to requests from execution unit 52 and TCU 60, respectively. When the execution unit provides a new message record to be added to the linked list of a given QP in memory 72, controller 74 checks free head pointer 100 to find the free entry 92 to which this new record is to be written. Preferably, LDB 68 issues credits to the execution unit to indicate that there are free entries available, and the execution engine will not process a WQE to generate a request message unless it has such a credit. Pointer 94 of free entry 92 points to the next free entry in the free list. Controller 74 updates free head pointer 100 so that it points to this next free entry, which now becomes the head of the free list. Meanwhile, RWE 76 fetches tail pointer 98 for the given QP from send context 67, via a QP context (QPC) interface buffer 82. Controller 74 uses pointer 98 to find the last record in the linked list for this QP, and updates pointer 94 of this last record (which previously had a null value) so that it now points to the new record that has just been written. It also instructs RWE 76 to update the value of tail pointer 98 in the send context 67 so that it points to the new record that has just been added to the end of the list.

When TCU 60 asks to pop a record from memory 72 for a given QP, RWE 76 fetches head pointer 96 for the QP from send context 67 via buffer 82, and pops the entry from the head of the list indicated by pointer 96. Controller 74 reads pointer 94 of this entry to determine the next entry in the linked list for this QP. RWE 76 updates the value of head pointer 96 in context 67 so that it points to this next entry, which now moves to the head of the list for this QP. Once the requested record has been popped from memory 72, it is no longer needed, and the corresponding entry can be added to the free list. For this purpose, controller 74 uses free tail pointer 102 to find the current last entry in the free list, and updates pointer 94 of this last entry so that it points to the entry that has just been read out. It then updates free tail pointer 102 to point to the new last entry in the free list. This entry is now available to be overwritten with another new record added to memory 72.

As noted above, execution unit 52 (FIG. 2) is responsible for writing new entries to LDB 68 as it prepares request messages for transmission over fabric 26. For each such message, the execution unit writes the record information (such as the QP number, PSN, descriptor address and other signals and flags, as listed above) to an execution unit interface (EXE) buffer 78. By the same token, when TCU 60 receives a response packet and determines the corresponding requester QP, it submits a request to receive the next record for that QP from LDB 68 via a TCU buffer 80. Alternatively, if the TCU already knows the location of the next record that it wants to read out of memory 72, it may simply submit a pointer to the entry, in order to save the time that would otherwise be needed to look up the location according to the QP number. (This readout mode is useful, for example, when the TCU must read two or more LDB records in succession for the same QP, due to receiving an aggregated acknowledgment of a number of successive messages sent on the same reliable QP. In each of the records that the TCU reads, it finds the pointer to the location of the next record.) An arbiter/dispatcher 84 arbitrates between the read and write requests received from the execution unit and TCU, and passes the requests to RWE 76 for execution. When the RWE returns the requested data from memory 72, the arbiter/dispatcher writes the data to buffer 80, to be read out by TCU 60.

Although the operation of LDB 68 is described above with reference particularly to its function in maintaining records of outstanding messages, the LDB can be viewed more generally as a cache of flexible size, which operates in conjunction with cache memory 66. While each QP receives an allocation of fixed size in memory 66, the QP allocations in LDS 68 grow and shrink in response to demand for each QP. The LDB can be shared among multiple QPs not only for recording outstanding messages, but also for managing other transport context records of variable size, such as scatter lists for use in handling data from incoming read response and send request messages. Furthermore, although the description of the LDB given here uses specific vocabulary and conventions of IB fabrics and channel adapters, the principles of the present invention may similarly be applied to other types of networks and adapters that must serve multiple transport instances concurrently.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for network communication, comprising;
    receiving, by a network interface adapter, work requests from a client device to send messages over a network using a plurality of transport service instances, such that each of the messages is associated with a respective one of the transport service instances;
    sending, by the network interface adapter, messages over the network in response to the work requests;
    storing, by the network interface adapter, in a common memory, in the network interface adapter, that shared among the transport service instances, records of the messages that have been sent over the network in respective lists according to the transport service instances with which the messages are associated, and
    upon completion of the messages, reading, by the network interface adapter, the records from the memory and, responsive thereto, reporting the completion to the client device;
    wherein storing the records comprises storing the lists together in a common database, in which each of the transport service instances has a respective number of entries, wherein the number is variable among the transport service instances; and
    wherein each transport service instance is assigned a respective variable portion of the common memory, in accordance with the respective number of entries of that transport service instance, for storing the respective list of that transport service instance.

2. A method according to claim 1, wherein the number of the entries for each of the transport services instances is determined by the number of the messages associated therewith that have been sent over the network and whose completion has not yet been reported to the client device by the completion unit.

3. A method according to claim 1, wherein the lists comprise a linked list of the entries maintained for each of the transport service instances.

4. A method according to claim 3, wherein storing the records comprises, upon sending one of the messages, pushing a corresponding one of the records onto a tail of the linked list, and wherein reading the records comprises popping the corresponding one of the records from a head of the linked list in order to report the completion.

5. A method according to claim 3, and comprising maintaining a further linked list of the entries in the database that are free for writing of further records thereto, wherein pushing the corresponding one of the records comprises selecting one of the entries from the head of the further linked list for writing the one of the records thereto.

6. A method according to claim 1, wherein at least some of the transport services instances belong to a reliable transport service, and wherein reading the records comprises reading the records of the messages sent using the reliable transport service upon receiving respective responses to the messages from the network, and wherein reporting the completion responsive to the records and to the responses.

7. A method according to claim 1, wherein sending the messages comprises sending data packets over the network.

8. A method according to claim 7, wherein the network comprises a switch fabric, and wherein sending the data packets comprises sending the packets over the switch fabric.

9. A method according to claim 8, wherein the transport service instances comprise queue pairs, which are used by the client device to interact with a transport layer of the network.

* * * * *